US011289896B2

(12) United States Patent
Liu et al.

(10) Patent No.: US 11,289,896 B2
(45) Date of Patent: Mar. 29, 2022

(54) SYSTEM AND METHOD FOR AUTONOMOUS MONITORING AND ACTIVE DEFENSE OF LIGHTNING

(71) Applicants: Chengdu University of Information Technology, Chengdu (CN); Institute of Atmospheric Physics, Chinese Academy of Sciences, Beijing (CN)

(72) Inventors: Kun Liu, Chengdu (CN); Rubin Jiang, Beijing (CN); Yuming Du, Chengdu (CN); Jiaming Jia, Chengdu (CN)

(73) Assignees: CHENGDU UNIVERSITY OF INFORMATION TECHNOLOGY, Chengdu (CN); INSTITUTE OF ATMOSPHERIC PHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/889,212

(22) Filed: Jun. 1, 2020

(65) Prior Publication Data
US 2020/0389010 A1 Dec. 10, 2020

(30) Foreign Application Priority Data

Jun. 10, 2019 (CN) .......................... 201910496267.7

(51) Int. Cl.
*H02H 3/22* (2006.01)
*H02H 1/00* (2006.01)

(52) U.S. Cl.
CPC ............ *H02H 3/22* (2013.01); *H02H 1/0007* (2013.01)

(58) Field of Classification Search
CPC .. G01R 19/0092; G01R 29/0842; H01Q 1/38; H01Q 1/50; H01Q 23/00; H01Q 9/045;
(Continued)

(56) References Cited

U.S. PATENT DOCUMENTS

| 2007/0103824 A1 | 5/2007 | Patterson et al. |
| 2011/0013336 A1* | 1/2011 | Hyde ..................... H02G 13/60 361/225 |

FOREIGN PATENT DOCUMENTS

| CN | 2425447 Y | 3/2001 |
| CN | 103412293 A | 11/2013 |

(Continued)

OTHER PUBLICATIONS

CNIPA First Office Action for corresponding CN Application No. 201910496267.7; dated Jun. 24, 2021.

*Primary Examiner* — Jared Fureman
*Assistant Examiner* — Nicolas Bellido
(74) *Attorney, Agent, or Firm* — Cantor Colburn LLP

(57) ABSTRACT

A system and method for autonomous monitoring and active defense of lightning includes a current sensor installed on a metal object, an antenna installed near the current sensor, a signal processing and warning module (SPWM), which is configured to detect received current and field pulse signals, and issuing an early warning signal when detecting origination and development of pulses of a downward stepped leader and an upward leader, where the early warning signal is sent to a controlled surge protection device (CSPD) and/or a polarized reconfigurable lightning protection antenna, and the CSPD completes on/off actions before a first return stroke and/or the lightning protection antenna becomes only to receive/transmit horizontally polarized electromagnetic waves.

15 Claims, 5 Drawing Sheets

(58) Field of Classification Search
CPC ........ H01Q 9/285; H02G 13/00; H02G 13/60; H02H 1/0007; H02H 3/04; H02H 3/22; H02H 9/04; H02H 9/041; H02H 9/06
See application file for complete search history.

(56) References Cited

FOREIGN PATENT DOCUMENTS

| | | | | |
|---|---|---|---|---|
| CN | 105244862 | A | | 1/2016 |
| CN | 105244862 | A | * | 1/2016 |
| CN | 205123243 | U | | 3/2016 |
| CN | 205544257 | U | | 8/2016 |
| CN | 106160171 | A | | 11/2016 |
| CN | 107565538 | A | * | 1/2018 |
| CN | 107834199 | A | | 3/2018 |
| CN | 207265655 | U | | 4/2018 |
| CN | 108539361 | A | | 9/2018 |
| CN | 208655886 | U | | 3/2019 |
| CN | 213072108 | U | * | 4/2021 |
| JP | 2006288126 | A | | 10/2006 |
| KR | 20100097500 | A | | 3/2010 |

* cited by examiner

SYSTEM AND METHOD FOR AUTONOMOUS MONITORING AND ACTIVE DEFENSE OF LIGHTNING

CROSS REFERENCE TO RELATED APPLICATIONS

The present application claims priority under 35 U.S.C. § 119 to Chinese Patent Application No. 201910496267.7, filed on Jun. 10, 2019, the entire content of which is incorporated herein by reference.

FIELD

The present invention pertains to the technical field of lightning protection, and more specifically relates to a lightning protection system and method with an early warning device and related protection devices.

BACKGROUND

Lightning is an atmospheric discharge phenomenon that occurs during a thunderstorm. In the natural world, about ⅔ of lightning occurs in the thunderstorm cloud, which is briefly referred to as cloud flash, and about ⅓ of lightning develops from the cloud to the ground and strikes ground objects, which is briefly referred to as ground flash. FIG. 1 is a schematic view of a typical ground flash process. As shown in FIG. 1, the process of ground flash striking a ground object generally includes the following processes: the downward stepped leader (negative) originates within the cloud and develops and extends downward; the downward stepped leader approaches the ground, and the upward connecting leader (positive) originates at the tip of a ground object, develops and extends upward; finally they are connected to form a return stroke.

Specifically, the occurrence and development process of ground flash can be summarized as: 1. a stepped leader process in which discharge is generated from the cloud and gradually develops toward the ground (because it manifests as a "hop-intermittent-hop" stepped propagation form), the development speed of which is generally in the order of 105 m/s; 2. a connecting leader process that develops upward from a group tip (usually a metal tip), the development speed of which is usually in the order of 104-105 m/s; 3. an attachment process in which the stepped leader is attached to the connecting leader at a height of about tens of meters to hundreds of meters; 4. a large current return stroke process generated after the attachment process is completed (because it appears for the first time, it is called a first return stroke). After the first return stroke, the discharge channel between the cloud and the ground is extinguished and cut off. However, in most cases, the negative ground flash will subsequently produce multiple return strokes, that is, after a certain time interval (typically tens of milliseconds), discharge will occur again in the cloud and develop downward rapidly (called dart leader) along the cloud-to-ground channel established by the previous "stepped leader-first return stroke", and be grounded to generate a second return-stroke, after which a similar "dart leader-return stroke" process may be generated multiple times. In order to make it easier to distinguish, return strokes after the first return stroke are collectively called "subsequent return strokes". Statistics show that the average number of return strokes for a complete negative ground flash is 4 to 5.

For lightning protection, the design and construction of a conventional surge protection device are planned for a certain determined lightning characteristic. Meanwhile, the conventional lightning protection system is designed for multi-level protection, and the protection is featured by dealing with unpredictable lightning strike events using a constant fixed design, which inevitably leads to accidents caused by protection failure in some cases.

Although lightning early warning devices (such as the publication number CN105244862A) and related protection devices (such as publication numbers CN107565538A and CN107834199A) have been developed for lightning protection in recent years so as to effectively perform lightning protection by related protection devices before return strokes that are likely to take place, some of the related protection devices cannot complete on/off actions before the first return stroke to provide timely and comprehensive protection, and some of them require an additional special design of related switches and are complicated in structure and expensive in cost, thus these lightning early warning protection devices do not have high reliability.

SUMMARY

In order to solve the above-mentioned problems, the present invention provides a system and method for autonomous monitoring and active defense of lightning based on a large number of experiments and reference documents, comprising: an antenna, a current sensor, a signal processing and warning module (SPWM), and a controlled surge protection device (CSPD) and/or polarized reconfigurable lightning protection antenna (LPA) related thereto, wherein the signal processing and warning module according to the present invention monitors the development characteristics of the upward leader pulse, so as to realize fast and reliable lightning warning before occurrence of a return stroke with large impulsive current; the surge protection device according to the present invention has a short response time, and can provide protection before the first return stroke and does not require subsequent multi-level protection, which is not affected by the waveform parameters of the return stroke current pulse such as the rise rate of the return stroke pulse current, the wave head duration, the total pulse duration and the pulse time interval; and the polarized reconfigurable lightning protection antenna according to the present invention has a simple structure and does not require installation of another specially designed microwave switch. In addition, the lightning protection system according to the present invention can also provide protection against non-direct lightning strikes (such as induced overvoltages/pulse currents formed on a protected device due to lightning strikes on nearby transmission lines or signal lines), for example, when lightning strikes take place nearby an overhead transmission line, providing protection for related devices and systems connected to the overhead transmission line.

The present invention achieves the above objectives through the following technical solutions:

A lightning protection system, comprising: a current sensor installed on a metal object that easily forms an upward connecting leader and easily monitors a pulse current formed thereby, which is configured to detect a current pulse signal generated by the upward connecting leader; an antenna installed near the current sensor, which is configured to detect a field pulse signal generated by a downward stepped leader; a signal processing and warning module (SPWM), which is configured to monitor and process the current pulse signal received by the current sensor and the field pulse signal received by the antenna, and issue an early warning signal when detecting origination and development of pulses of the downward stepped leader and the upward leader, wherein the early warning signal is sent to a controlled surge protection device (CSPD) and/or a polarized reconfigurable lightning protection antenna; in response, the controlled surge protection device (CSPD) completes on/off actions before a first return stroke so that a surge pulse cannot reach a back-end load, and the polarized reconfigurable lightning protection antenna becomes a polarized state of only receiving/transmitting horizontally polarized electromagnetic waves so that a return stroke current pulse cannot form a surge current through antenna coupling to reach a rear-end device or interface of the antenna.

A lightning protection method, comprising: obtaining, by a current sensor, a current pulse signal generated by an upward connecting leader on the tip of a metal object on the ground; obtaining, by an antenna near the current sensor, a field pulse signal generated by a downward stepped leader; processing a received current pulse signal and a received field pulse signal to determine that lightning is about to occur; and issuing an early warning signal in the case where it is detected that lightning is about to occur, wherein the early warning signal is sent to a controlled surge protection device (CSPD) and/or a polarized reconfigurable lightning protection antenna; in response, the controlled surge protection device (CSPD) completes on/off actions before a first return stroke so that a surge current pulse cannot reach a back-end load, and the polarized reconfigurable lightning protection antenna becomes a polarized state of only receiving/transmitting horizontally polarized electromagnetic waves so that a return stroke current pulse cannot form a surge current through antenna coupling to reach a rear end device or interface of the antenna.

A lightning protection system, comprising a signal processing and warning module (SPWM), the signal processing and warning module comprising: a signal receiving module, which is configured to receive a field pulse signal generated by a downward stepped leader and a current pulse signal generated by an upward connecting leader; a sampling circuit, which is configured to sample, quantize and encode a received pulse signal; a storage circuit, which is configured to rapidly store data of a pulse signal; and a main controller, which is configured to detect the pulse signal, wherein the main controller performs the following operations: (1) detecting a duration of a current pulse of the upward connecting leader, an interval between pulses and the number of successive pulses within fixed time; (2) detecting a duration of a field pulse of the downward stepped leader and the number of successive pulses within fixed time; (3) comparing them with predetermined conditions, respectively; and (4) issuing an early warning signal when the predetermined conditions are all met.

A lightning protection system, comprising a controlled surge protection device (CSPD), the controlled surge protection device comprising a metal plate, a first switch K1, a second switch K2, a third switch K3 and a gas discharge tube D3, wherein the first switch K1 and the second switch K2 are connected in series between a power supply and a load, the gas discharge tube D3 is connected between a point A between the power supply and the first switch K1 and the ground, and the third switch K3 and the metal plate are connected in series between a point E between the first switch K1 and the second switch K2 and the ground, wherein a breakdown voltage of the gas discharge tube D3 is higher than a supply voltage and lower than a breakdown voltage of the first switch K1.

A lightning protection system, comprising a polarized reconfigurable lightning protection antenna, the polarized reconfigurable lightning protection antenna comprising: a cross dipole antenna, which comprises a first horizontal patch, a second horizontal patch, a first vertical patch, and a second vertical patch; a balun structure and a coaxial line, which are connected to the cross dipole antenna through a first link patch and a second link patch respectively; and a switching element between the link patch and the cross dipole antenna, wherein the first link patch is connected to the first vertical patch via a first switching element D1, to the second vertical patch element via a fourth switching element D4, and to the first horizontal patch via a fifth switching element D5, and the second link patch is connected to the first vertical patch via a third switching element D3, to the second vertical patch via a second switching element D2, and to the second horizontal patch via a sixth switching element D6.

1—lightning rod, 2—antenna, 3—current sensor, 4—signal processing and warning module (SPWM), 5—polarized reconfigurable lightning protection antenna (LPA), 6—ground stud, 7—transmission station, 8—controlled surge protection device (CSPD), 9—first horizontal patch, 10—second horizontal patch, 11—first vertical patch, 12—second vertical patch, 13—balun structure, 14—coaxial line.

DETAILED DESCRIPTION

The principles and features of the present invention will be described below in conjunction with the drawings. The provided examples are only used to explain the present invention, and not intended to limit the present invention.

Figure 1:
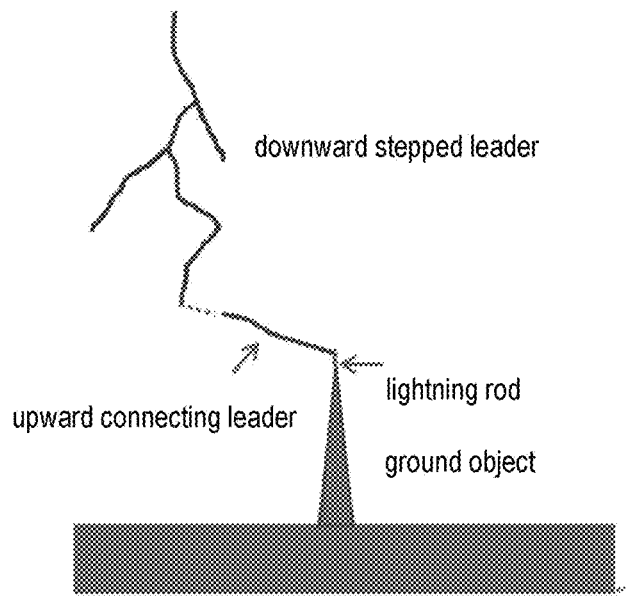
FIG. 1 is a schematic view typically illustrating ground flash striking a ground object.
Figure 2:
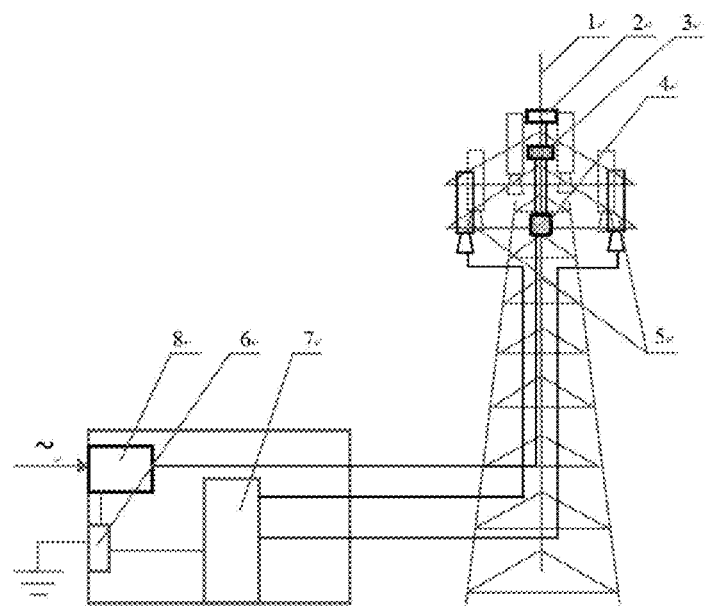
FIG. 2 is a schematic view of a lightning protection system according to the present invention.

FIG. 2 is a schematic view of a lightning protection system according to the present invention. As shown in FIG. 2, the lightning protection system comprises: a lightning rod 1, an antenna 2, a current sensor 3, a signal processing and warning module (SPWM) 4, a polarized reconfigurable lightning protection antenna (LPA) 5, a ground stud 6, a transmission station 7 and a controlled surge protection device (CSPD) 8, etc.

As an example but not a limitation, the lightning rod 1 is installed on the top of a ground object that needs protection, such as a communication tower. When a downward stepped leader develops toward and approaches the ground, the lightning rod 1 will firstly originate and form an upward-developing connecting leader, and the current sensor 3 is installed on the lightning rod 1 to monitor a pulse current formed on the lightning rod 1 due to the development of the upward leader. The current sensor 3 may also be installed on other metal objects that easily form an upward connecting leader and easily monitor a pulse current formed thereby as required. The current sensor 3 may be, for example, a Rogowski coil or a shunt, and may be sleeved on the lightning rod 1, for example.

The antenna 2 may be on or near a tower, but not inside it, because an iron tower will shield the antenna 2, making it difficult to receive the field generated by the downward leader, so that it cannot effectively acquire and monitor signals. In addition, the antenna 2 should be installed near the current sensor 3, for example, within a distance of 100 meters from the current sensor. The outputs of the current sensor 3 and the antenna 2 are connected to two input ports of the signal processing and warning module 4 respectively, and the early warning signal output of the signal processing and warning module 4 is connected to the control signal input terminal of the controlled surge protection device (CSPD) 8 and/or polarized reconfigurable lightning protection antenna (LPA) 5. Alternatively, the early warning signal may also be sent by a wireless communication module, so as to realize early warning to other protected devices nearby. In addition, when lightning strikes occur, the ground stud 6 can effectively short-circuit the large current generated by lightning to the ground, and the transmission station 7 is used, for example, to provide a communication signal for the polarized reconfigurable lightning protection antenna (LPA) 5.

Figure 3:
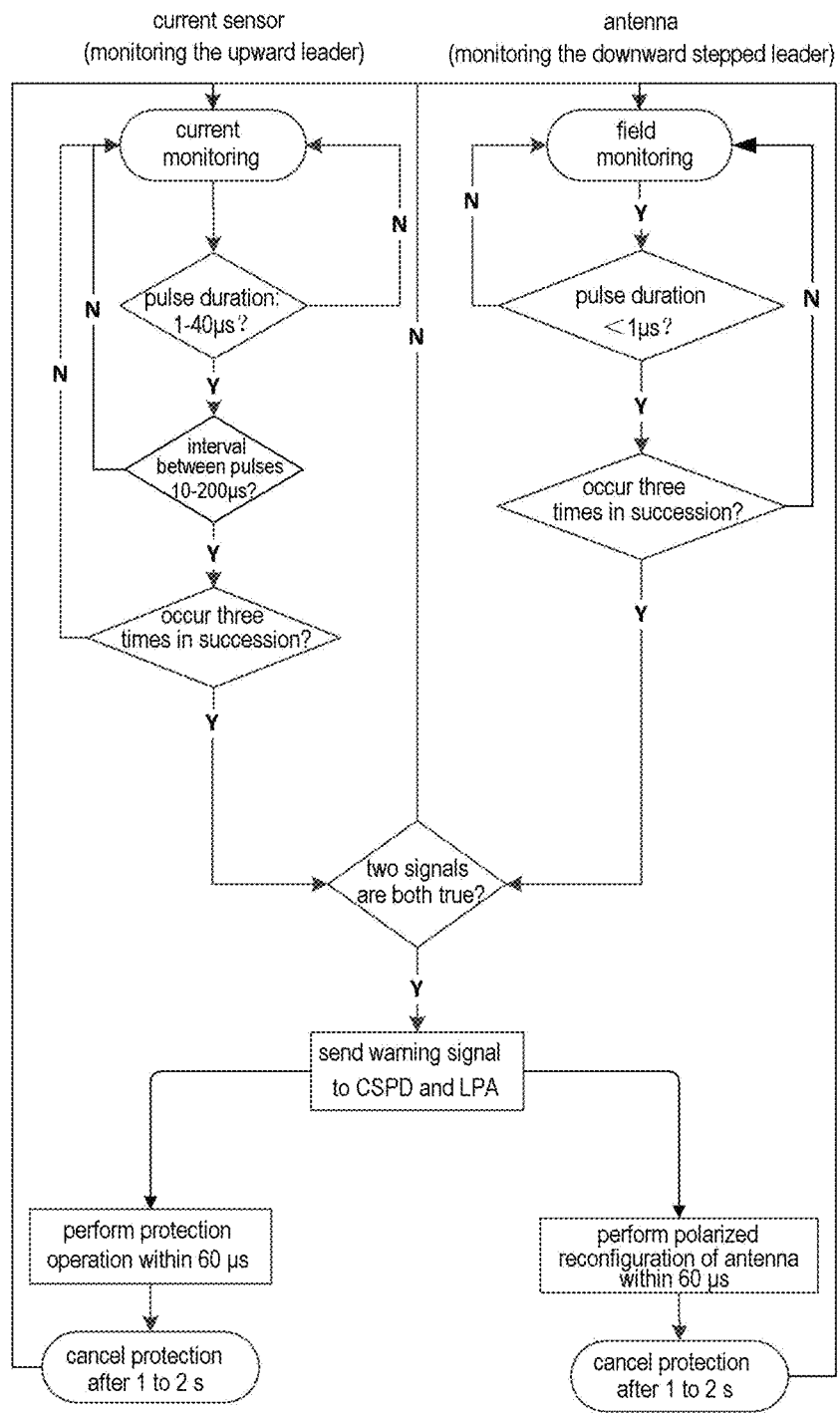
FIG. 3 is a flow chart of the operating principle of the lightning protection system according to the present invention.

FIG. 3 is a flow chart of the operating principle of the lightning protection system according to the present invention. As shown in FIG. 3, the pulse current of the upward leader is monitored using the current sensor. As an example but not a limitation, the operating bandwidth of the current sensor ranges from 0 to 1 MHz, and the measurement range is from 1 A to 2 kA. The current sensor firstly monitors whether the duration of a half-peak width of the current pulse is within 1-40 μs, if it is within 1-40 μs, continues to monitor whether the pulse interval is within 10-200 μs, if it is within 10-200 μs, continues to monitor the number of times the pulse occurs in succession, and if the pulse occurs up to three times in succession, generates an early warning signal, otherwise returns to the step of monitoring the duration of the current pulse.

Simultaneously, the field pulse of the downward stepped leader is monitored using the antenna. For example, the antenna can operate at low frequency (LF) and very low frequency (VLF). At the same time, relevant parameters may be adjusted according to local practical situations. The antenna firstly monitors whether the pulse duration (e.g. half-peak width) of the field pulse (e.g. E-field pulse) is less than 1 μs, if it is less than 1 μs, continues to monitor whether the pulse appears three or more times in succession, and if the pulse appears three or more times, generates an early warning signal, otherwise returns to the step of monitoring the duration of the field pulse.

When the current pulse monitoring of the upward leader and the field monitoring of the downward leader generate an early warning signal at the same time, an early warning signal is issued to protection devices (such as CSPD and LPA), otherwise they each return to the step of monitoring the pulse duration. After receiving the early warning signal, the protection device completes a corresponding protection action within 60 microseconds to change from the normal state to the protection state before the first return stroke.

Since the total duration of lightning is usually less than 1 second in most cases, the protection device can return to the normal state after 1 to 2 seconds (this setting may be adjusted according to the local meteorological conditions and specific needs of actual protection). It is necessary to note that for a downward negative flash, the protector is in the protection state only when the conditions of current pulse and field pulse are simultaneously met. If only one condition is met, it may be caused by enhancement of the atmospheric electric field or the field pulse generated by discharge in the cloud and the resulting point discharge of the lightning rod.

Signal Processing and Warning Module (SPWM)

Figure 4:
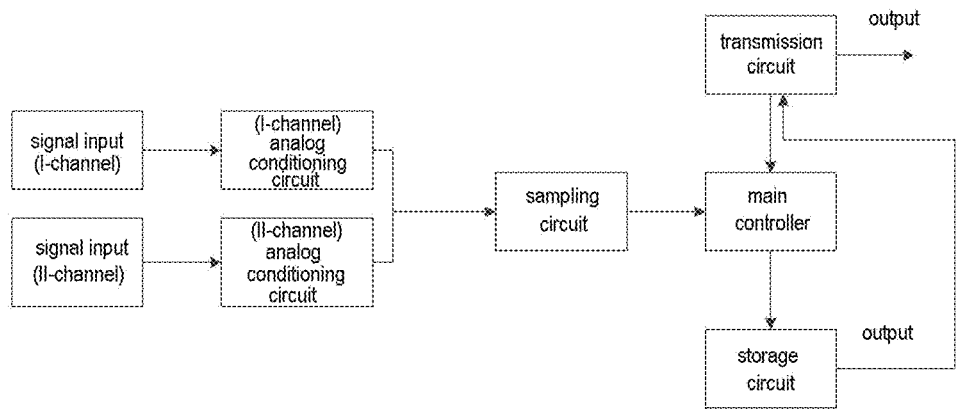
FIG. 4 is a hardware structure diagram of a signal processing and warning module for a lightning protection system according to the present invention.

FIG. 4 is a hardware structure diagram of a signal processing and warning module (SPWM) for a lightning protection system according to the present invention. As an example, as shown in FIG. 4, the signal processing and warning module (SPWM) comprises a signal receiving module composed of a signal input and an analog conditioning circuit, a sampling circuit, a main controller, and a storage circuit, etc.

The signal receiving module has two-channel signal inputs to receive the current pulse signal of the upward leader and the field pulse signal of the downward leader respectively, and amplifies, differentiates and offsets the received analog signal in the analog conditioning circuit. The sampling circuit may operate at a sampling rate of, for example, 20 MHz, and transmits the pulse signal after sampling, quantization, and encoding to the main controller. After detecting the leader pulse, the storage circuit may store, for example, data of 10 consecutive milliseconds, including the leader pulse.

Figure 5:
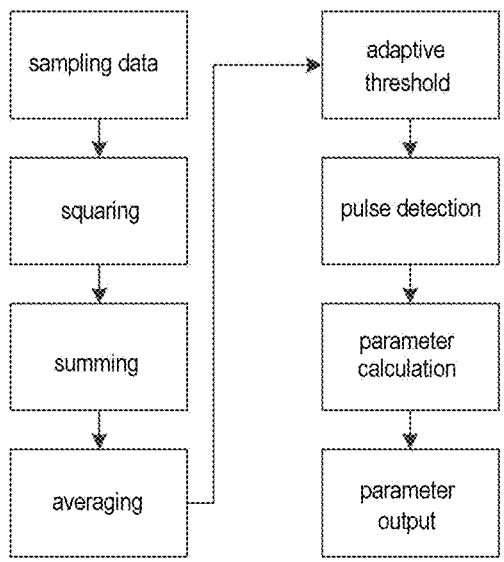
FIG. 5 is a flow chart for pulse signal detection according to the present invention.

For the two-channel input pulse signals, the main controller separately counts the number of pulses within fixed time (for example, 200 microseconds), and calculates the pulse width, rise time, fall time, pulse level, etc. of each pulse. Since the leader pulse may be a positive pulse or a negative pulse, power detection with constant false alarm rate is employed. FIG. 5 shows a flow for pulse signal detection according to the present invention: 1) squaring each sampling point to obtain an instantaneous power value; 2) calculating a noise power by summing and averaging data within fixed time (for example, 2 milliseconds), and obtaining an adaptive threshold by means of the noise power; 3) comparing the obtained threshold with instantaneous power signals after delay (for example, 200 microseconds) one by one to obtain a detection result; 4) determining whether it is a valid pulse by means of time width information (for example, greater than 0.2 microseconds) of the detection result, and calculating the pulse rise time, fall time and pulse number, and finally outputting the pulse number, pulse width, rise time, fall time and pulse level.

Controlled Surge Protection Device (CSPD)

Figure 6:
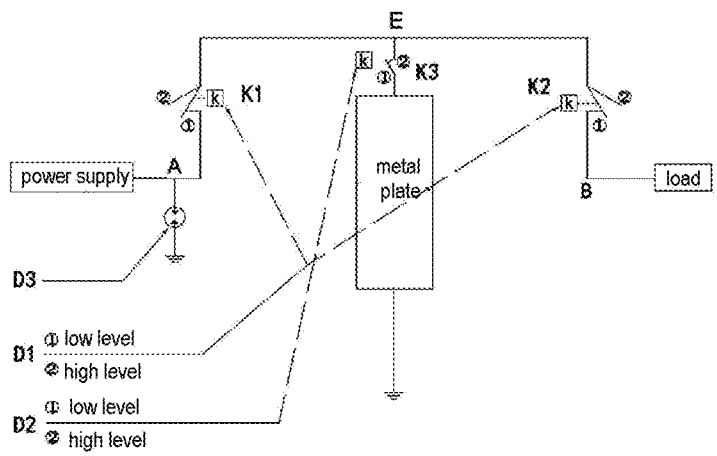
FIG. 6 is a schematic structural view of a controlled surge protection device for a lightning protection system according to the present invention.

FIG. 6 is a schematic structural view of a controlled surge protection device for a lightning protection system according to the present invention. Unlike previous surge protection devices, the controlled SPD (CSPD) comprises switches with an operation time on the order of microseconds or even shorter. These switches may be controlled by the above signal processing and warning module (SPWM) (e.g., closed at low level and disconnected at high level), so that, for example, after receiving the early warning signal, the CSPD can change to the protection state within a few microseconds (before the first return stroke), and reset to the normal state after 1 to 2 seconds.

The controlled surge protection device shown in FIG. 6 comprises a metal plate (which mainly functions as shielding and isolation), a first switch K1, a second switch K2, a third switch K3, and a gas discharge tube D3. The first switch K1 and the second switch K2 are connected in series between a power supply (such as mains) and a load, the gas discharge tube D3 is connected between a point A between the power supply and the first switch K1 and the ground, and the third switch K3 and the metal plate are connected in series between a point E between the first switch K1 and the second switch K2 and the ground.

As shown in FIG. 6, one terminal of the first switch K1, the second switch K2, and the third switch K3 is connected to a node E, the other terminal of the first switch K1 is connected to a contact point A, the other terminal of the second switch K2 is connected to a contact point B, and the other terminal of the third switch K3 is connected to the metal plate. The control terminals of the first switch K1, the second switch K2 and the third switch K3 are connected to the signal output terminal of the SPWM. When the CSPD receives the warning signal issued by the SPWM, the CSPD completes the actions before the first return stroke, i.e., disconnecting K1 and K2, turning on K3, cutting off the connection between the back-end load and the external power supply. The breakdown voltage of the switch K1 remains greater than the breakdown voltage of the gas discharge tube D3, and the breakdown voltage of the gas discharge tube D3 (D3 may be selected according to the requirements of the SPD installed at LPZ0_A/LPZ1 in relevant standards) is higher than the supply voltage (operating voltage). Therefore, D3 will give priority to breakdown and discharge and discharge the surge current generated by the return stroke to the ground. At the same time, because K1 and K2 are disconnected and K3 is turned on, the overvoltage formed by the surge pulse before discharge of D3 cannot reach the load end at the rear end of the switch, which achieves the purpose of protecting power electronics while preventing the protection method from being affected by the pulse waveform.

Polarized Reconfigurable Lightning Protection Antenna (LPA)

Figure 7:
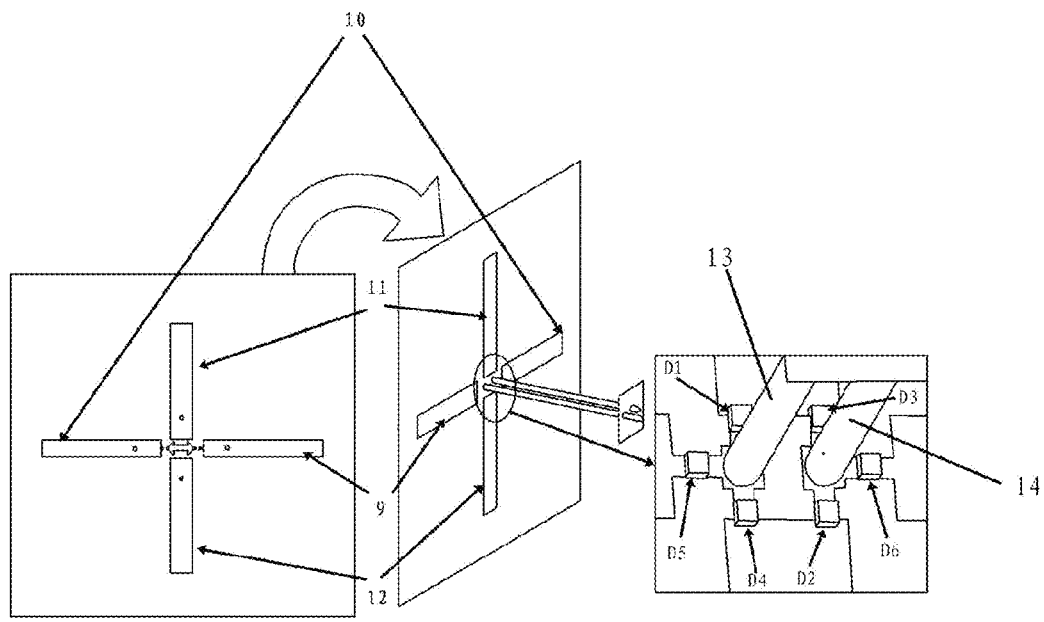
FIG. 7 is a schematic structural view of a polarized reconfigurable lightning protection antenna for a lightning protection system according to the present invention; and FIG. 8A to FIG. 8D is an antenna performance diagram of the polarized reconfigurable lightning protection antenna shown in FIG. 7 when operating in a ±45° polarization mode.

FIG. 7 is a schematic structural view of a polarized reconfigurable lightning protection antenna for a lightning protection system according to the present invention. When the lightning protection antenna is in a normal operating state, it transmits and receives ±45° polarized electromagnetic waves. When an early warning signal is received from the SPWM, it switches to a horizontally polarized state. Because the vertical electric field of lightning (lightning that strikes ground objects, that is, the main component of the electric field of the cloud-to-ground flash) does not match the horizontally polarized mode of the lightning protection antenna in the protection state, the electromagnetic energy of lightning that strikes the lightning rod of an iron tower cannot be smoothly coupled into a back-end feeder line through the lightning protection antenna, thereby realizing lightning protection.

The basic function of the lightning protection antenna (LPA) according to the present invention is to change the polarized state of the antenna within a few microseconds after receiving the early warning signal, that is, to change from the ±45° polarized operating mode to the horizontally polarized mode, and reset after 1 to 2 seconds.

Taking a microstrip antenna operating in the GSM frequency band as an example, the polarized reconfigurable lightning protection antenna shown in FIG. 7 comprises: a dielectric plate, a patch dipole in the vertical direction, and a patch dipole in the horizontal direction, two link patches, six PIN diodes (D1-D6), balun, coaxial line, etc. The two link patches are connected to the balun structure and the coaxial line respectively, and have 1 mm gaps with the patch dipoles where the PIN diodes are disposed. Different parts of the patch dipoles are controlled to be connected to the balun/coaxial line through the PIN diodes to realize conversion among different polarized states of the antenna. Assuming that the length and width of the patch dipole in the vertical direction are Lv and Wv, the length and width of the patch dipole in the horizontal direction are Lh and Wh, and the height of the balun is H, for example, Lv=70 mm, Wv=14.5 mm, Lh=68 mm, Wh=14 mm, H=90 mm. To facilitate description, as shown in FIG. 7, the patch dipole in the horizontal direction is divided into a first horizontal patch 9 and a second horizontal patch 10, and the patch dipole in the vertical direction is divided into a first vertical patch 11 and a second vertical patch 12.

The operating states of the diodes are shown in Table 1. When the diodes D5, D6 are turned on, and D1, D2, D3, D4 are turned off, the first horizontal patch 9 is connected to the balun and the second horizontal patch 10 is connected to the coaxial line, and the antenna is in a horizontally polarized state. When the diodes D3, D4, D5, D6 are turned on, and D1, D2 are turned off, the first horizontal patch 9 and the second vertical patch 12 are connected to the balun, the first vertical patch 11 and the second horizontal patch 10 are connected to the coaxial line, and the antenna is in a 45° polarized state. When the diodes D1, D2, D5, D6 are turned on, and D3, D4 are turned off, the first horizontal patch 9 and the first vertical patch 11 are connected to the balun, the second horizontal patch 10 and the second vertical patch 12 are connected to the coaxial line, and the antenna is at −45° polarized state.

TABLE 1

Operating mode of the polarized reconfigurable antenna

| Polarization mode | D1, D2 | D3, D4 | D5, D6 |
|---|---|---|---|
| Horizontal polarization | turned off | turned off | turned on |
| 45° polarization | turned off | turned on | turned on |
| −45° polarization | turned on | turned off | turned on |

Figure 8A:
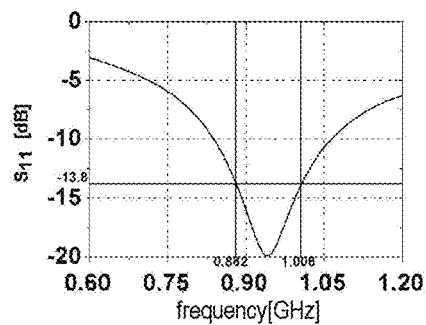
Figure 8B:
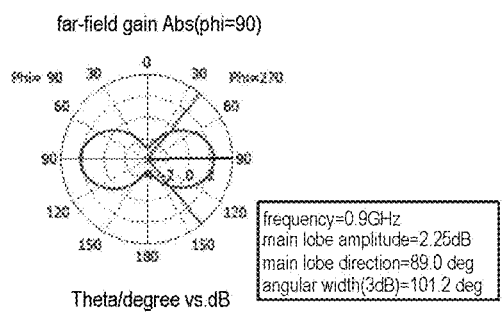
Figure 8C:
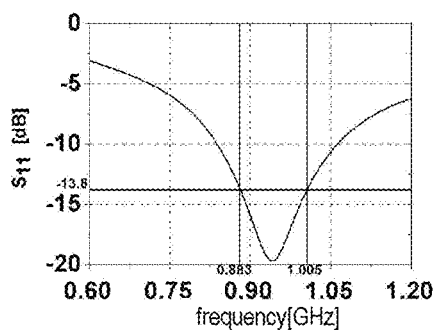
Figure 8D:
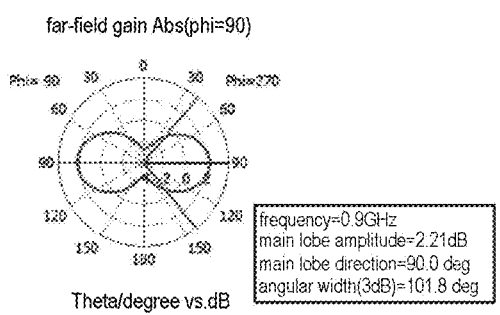

FIGS. 8A and 8B show S11 and a directional diagram of the polarized reconfigurable antenna operating in a 45° polarized mode, and FIGS. 8C and 8D show S11 and a directional diagram of the polarized reconfigurable antenna operating in −45° polarized mode. It can be seen from the figures that when the antenna operates at 45° and −45° polarization, the operating frequency bands of S11<−13.8 dB (VSWR<1.5) are 882 MHz-1005 MHz and 883 MHz-1006 MHz, respectively. It can be seen that when the polarized reconfigurable antenna operates in the above two polarized modes, it completely covers the mobile uplink frequency band (890 MHz-909 MHz) and the downlink frequency band (935 MHz-954 MHz) of China GSM.

The above embodiments are only preferred implementations of the present invention and are not limitations on the technical solutions of the present invention. Technical solutions that can be achieved on the basis of the above embodiments without spending inventive efforts shall be considered as failing within the scope of protection of the present invention.

The invention claimed is:

1. A lightning protection system, comprising:
    a current sensor installed on a metal object that forms an upward connecting leader and monitors a pulse current formed thereby, which is configured to detect a current pulse signal generated by the upward connecting leader;
    an antenna installed near the current sensor, which is configured to detect a field pulse signal generated by a downward stepped leader;
    a signal processing and warning module (SPWM), which is configured to detect and process a received current pulse signal and a received field pulse signal, and issue a warning signal in case lightning development characteristics are captured,
    characterized in that, the early warning signal is sent to at least one of a controlled surge protection device (CSPD) and a polarized reconfigurable lightning protection antenna; in response, the controlled surge protection device (CSPD) completes on/off actions before a first return stroke so that a surge pulse cannot reach at least one of a back-end load and the polarized reconfigurable lightning protection antenna becomes only to receive/transmit horizontally polarized electromagnetic waves so that a lightning electromagnetic field cannot form a surge current through antenna coupling to reach a rear end of the antenna.

2. The lightning protection system according to claim 1, characterized in that the metal object is a lightning rod, and a horizontal distance from the antenna to the current sensor is less than 100 m.

3. The lightning protection system according to claim 1, comprising the signal processing and warning module (SPWM), the signal processing and warning module comprising:
    a signal receiving module, which is configured to receive a field pulse signal generated by a downward stepped leader and a current pulse signal generated by an upward connecting leader;
    a sampling circuit, which is configured to sample, quantize and encode a received pulse signal;
    a storage circuit, which is configured to rapidly store data of a pulse signal; and
    a main controller, which is configured to detect the pulse signal,
    characterized in that the main controller performs the following operations: (1) detecting a duration of a current pulse of the upward connecting leader, an interval between pulses and the number of successive pulses within fixed time; (2) detecting a duration of a field pulse of the downward stepped leader and the number of successive pulses within fixed time; (3) comparing them with predetermined conditions, respectively; and (4) issuing an early warning signal when the predetermined conditions are all met.

4. The system according to claim 3, characterized in that, for the predetermined conditions, the duration of a half-peak width of the current pulse of the upward connecting leader is 1-40 μs, the interval between pulses is 10-200 μs, and the number of successive pulses within fixed time of 200 μs is more than 3 times; and the duration of the field pulse of the downward stepped leader is less than 1 μs, and the number of successive pulses within fixed time of 200 μs is more than 3 times.

5. The system according to claim 3, characterized in that, detecting a pulse signal comprises detecting a pulse width, rise time, a fall time, and a pulse level of each pulse, comprising the following steps:
    1) squaring each sampling point to obtain an instantaneous power value;
    2) calculating a noise power by summing and averaging data at fixed time, and obtaining an adaptive threshold by means of the noise power;
    3) comparing an obtained threshold with instantaneous power signals after delay one by one to obtain a detection result;
    4) determining whether it is a valid pulse by means of time width information of the detection result, calculating pulse rise time, pulse fall time and a pulse number, and finally outputting a pulse number, a pulse width, rise time, fall time and a pulse level.

6. The system according to claim 3, characterized in that, after detecting a leader pulse, the storage circuit stores data of subsequent 10 milliseconds including the leader pulse.

7. The lightning protection system according to claim 1, comprising the controlled surge protection device (CSPD), the controlled surge protection device comprising a metal plate, a first switch K1, a second switch K2, a third switch K3 and a gas discharge tube D3, characterized in that the first switch K1 and the second switch K2 are connected in series between a power supply and a load, the gas discharge tube D3 is connected between a point A between the power supply and the first switch K1 and a ground, and the third switch K3 and the metal plate are connected in series between a point E between the first switch K1 and the second switch K2 and the ground, wherein a breakdown voltage of the gas discharge tube D3 is higher than a supply voltage and lower than a breakdown voltage of the first switch K1.

8. The system according to claim 7, characterized in that the first switch K1 and the second switch K2 are normally closed, and the third switch K3 is disconnected, so as to realize an operating state in which the power supply supplies power to the load; upon detecting lightning, before a first return stroke, the first switch K1 and the second switch K2 are disconnected, and the third switch K3 is closed, so as to realize a protection state in which a surge current is discharged to the ground through the gas discharge tube.

9. The system according to claim 8, characterized in that it automatically returns to the operating state after the protection state continues for 1-2 seconds.

10. The lightning protection system according to claim 1, comprising the polarized reconfigurable lightning protection antenna, the polarized reconfigurable lightning protection antenna comprising:
    a cross dipole antenna, which comprises a first horizontal patch 9, a second horizontal patch 10, a first vertical patch 11, and a second vertical patch 12;
    a balun structure 13 and a coaxial line 14, which are connected to the cross dipole antenna through a first link patch and a second link patch respectively; and
    a switching element between the link patch and the cross dipole antenna,
    characterized in that:
    the first link patch is connected to the first vertical patch 11 via a first switching element D1, to the second vertical patch element 12 via a fourth switching element D4, and to the first horizontal patch 9 via a fifth switching element D5, and
    the second link patch is connected to the first vertical patch 11 via a third switching element D3, to the second vertical patch 12 via a second switching element D2, and to the second horizontal patch 10 via a sixth switching element D6.

11. The lightning protection system according to claim 10, characterized in that when the fifth switching element and the sixth switching element are turned on, and the first switching element, the second switching element, the third switching element and the fourth switching element are turned off, the first horizontal patch is connected to the first link patch, the second horizontal patch is connected to the second link patch, and the antenna is in a horizontally polarized state; when the third switching element, the fourth switching element, the fifth switching element and the sixth switching element are turned on, and the first switching element and the second switching element are turned off, the first horizontal patch and the second vertical patch are connected to the first link patch, the second horizontal patch and the first vertical patch are connected to the second link patch, and the antenna is in a 45° polarized state; when the first switching element, the second switching element, the fifth switching element and the sixth switching element are turned on, and the third switching element and the fourth switching element are turned off, the first horizontal patch and the first vertical patch are connected to the first link patch, the second horizontal patch and the second vertical patch are connected to the second link patch, and the antenna is in a −45° polarized state.

12. The lightning protection system according to claim 10, characterized in that the antenna is normally in a ±45° polarized operating state, and in a horizontally polarized protection state when it is detected that lightning is about to occur.

13. The lightning protection system according to claim 12, characterized in that it automatically returns to the operating state after the protection state continues for 1 to 2 seconds.

14. A lightning protection method, comprising:
  detecting, by a current sensor, a current pulse signal generated by an upward connecting leader on a metal object;
  monitoring, by an antenna near the current sensor, a field pulse signal generated by a downward stepped leader;
  processing a received current pulse signal and a received field pulse signal to determine occurrence of lightning; and
  issuing an early warning signal in case lightning is detected,
  characterized in that, the early warning signal is sent to at least one of a controlled surge protection device (CSPD) and a polarized reconfigurable lightning protection antenna; in response, the controlled surge protection device (CSPD) completes on/off actions before a first return stroke so that a surge pulse cannot reach at least one of a back-end load and the polarized reconfigurable lightning protection antenna becomes only to receive/transmit horizontally polarized electromagnetic waves so that a lightning electromagnetic field cannot form a surge current through antenna coupling to reach a rear end of the antenna.

15. The method according to claim 14, characterized in that the metal object is a lightning rod, and a horizontal distance from the antenna to the current sensor is less than 100 m.

* * * * *